Figure 1:
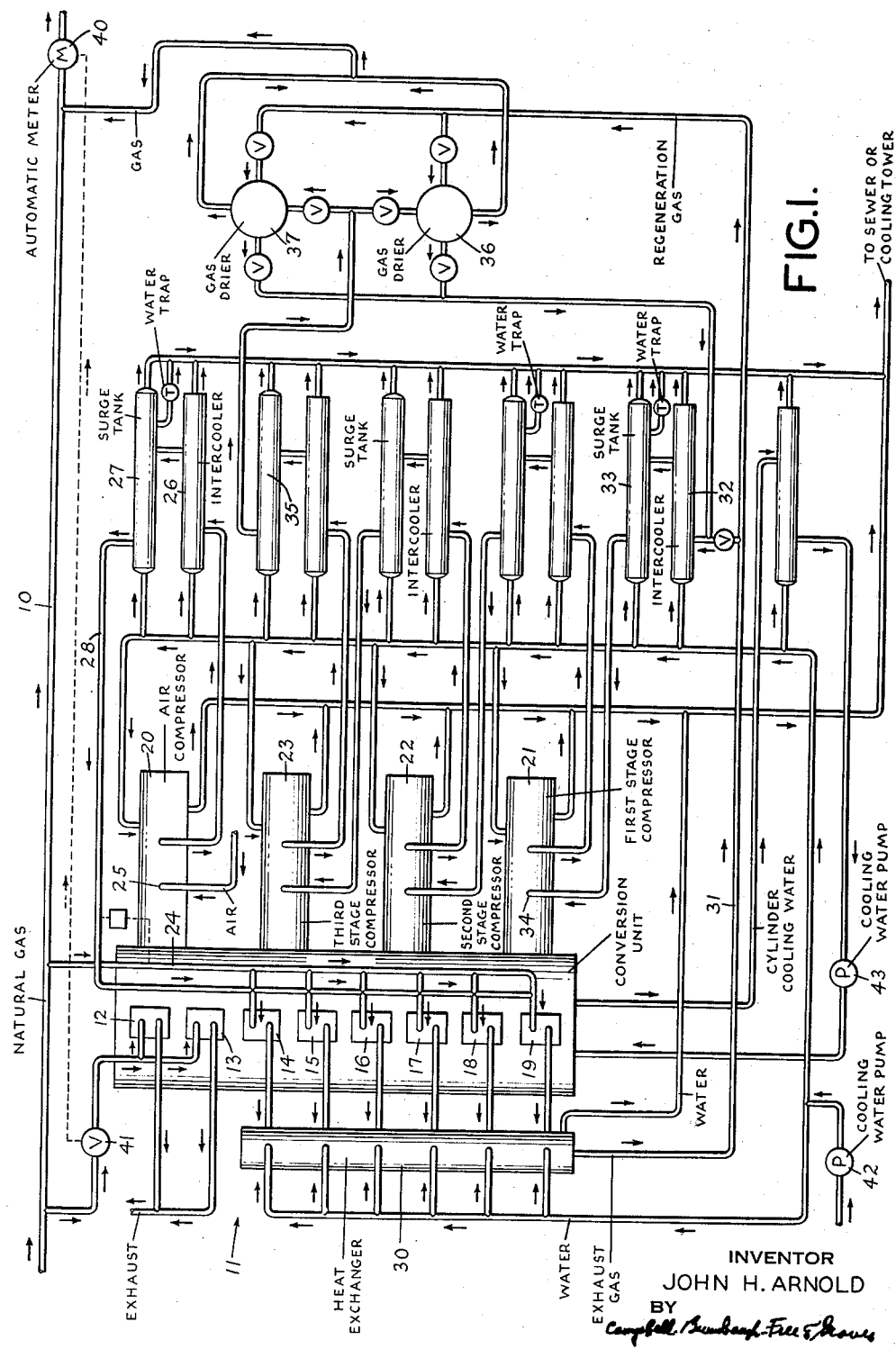

Dec. 23, 1958　　　　　J. H. ARNOLD　　　　　2,865,724
CONTROL OF HEATING VALUE OF FUEL GAS
Filed Dec. 14, 1954　　　　　　　　　　　2 Sheets-Sheet 1

FIG.I.

INVENTOR
JOHN H. ARNOLD
BY
HIS ATTORNEYS

Dec. 23, 1958 J. H. ARNOLD 2,865,724
CONTROL OF HEATING VALUE OF FUEL GAS
Filed Dec. 14, 1954 2 Sheets-Sheet 2

INVENTOR
JOHN H. ARNOLD
BY
HIS ATTORNEYS

United States Patent Office 2,865,724
Patented Dec. 23, 1958

2,865,724

CONTROL OF HEATING VALUE OF FUEL GAS

John Henry Arnold, Summit, N. J.

Application December 14, 1954, Serial No. 475,191

12 Claims. (Cl. 48—196)

This invention relates to methods and systems for regulating and controlling the heating value of fuel gases, such as natural gas, propane and the like, to render them suitable for household and industrial use and, more particularly, to reduce the heating value of gases having a high B. t. u. content to a uniform and predetermined level suitable for such household and industrial use.

The widespread use of natural gas as a supplement to or a substitute for manufactured gas has introduced many problems in the distribution, control and supply of the gas for household and industrial heating and the like. Natural gas has a heating value (B. t. u. content) about double that of manufactured gas so that it cannot be substituted for or mixed with manufactured gas, without adjusting or modifying the equipment in which the natural gas is burned. It has been proposed to dilute natural gas to reduce its heating content with various other gases of lower heating value or not heating value but each of these proposals requires gas producing equipment to supply the diluting gas, thereby involving substantial capital expenditures. It has been proposed also to dilute natural gas with air to reduce its heating value, but the presence of air in the gas renders it unsafe and undesirable for household use. Moreover, in some industrial applications, for example, when air-diluted natural gas is used instead of coke oven gas for heating soaking pits of steel mills, the presence of air in the natural gas produces undesirable oxidation effects on the surfaces of the ingots. Such air-diluted gas, therefore, is not a satisfactory substitute for manufactured or other artificial gases in many applications, even if its dangerous properties are disregarded.

In gas distributing and supply systems, natural gas also presents difficulties in pricing because all natural gas does not have the same heating value. Gas from different wells varies considerably in heating value and the heating value of gas from the same well may also vary considerably as the well approaches depletion. Therefore, the gas flowing in the distributing system or in storage, may, and usually does vary in heating value from day to day so that charges for gas based on an estimated B. t. u. value of the gas consumed are frequently erroneous.

The present invention provides methods and systems by means of which the difficulties encountered in the distribution, supply and use of natural gas and other gases having high heating values, such as propane, produced from liquid propane, can be overcome. The new methods and systems enable production of gas having an accurately controlled heating value which can be mixed with or substituted for manufactured gas, coke oven gas and the like, without modification of existing equipment for using the gas. The new methods and systems can be installed and used any place in the distributing system or as a standby source of gas, for exmaple, when peak demands exceed the capacity of a manufactured gas plant or the storage facilities available at the place of use. The new methods and systems may be practiced and used at the feed end of a distributing system because it can make use of existing equipment there, as will be explained more fully hereinafter, thereby markedly reducing the cost of installation of the new systems.

More particularly, the invention involves diluting a gas of high heating value with a gas of lower heating value that is produced by burning a portion of the gas of high heating value in the presence of a deficiency of air or other oxygen-containing gas so as to produce a low heating value gas and power which may be utilized in any desired way. It is particularly advantageous to burn the gas in an internal combustion engine, such as a two or four-cycle engine, a compression ignition-type of engine, such as a diesel engine, or a gas turbine. However, if desired, it can be even be burned as a fuel for heating boilers or the like for the generation of power. Inasmuch, however, as large internal combustion engines are usually available at gas pumping stations to operate the compressors for delivering the gas into the system, such engines are most conveniently used in the present system for practicing the present invention.

In practice, it is desirable to supply the fuel gas to the engine with highly supercharged air in an amount insufficient to burn the fuel gas to carbon dioxide and water. In this way, the products of combustion have a low heating value and can be mixed with the natural gas in the system, without danger of introducing any undesirable components, such as, for example, oxygen, into the system. The power generated by combustion of the fuel gas in the engine can be used for driving a supercharger or compressors by means of which the air is compressed and it may also be used for compressing the exhaust gas to a high enough pressure to enable it to be mixed with high pressure natural gas being supplied to the pipe lines. By selecting an engine of suitable operating characteristic, the output of gas and the output of power can be made optimum for a given system so that supplemental power from an outside source is not required. A system of the type described is regulated by means of a meter and a control valve system for regulating the supply of fuel gas to the engine or to an auxiliary controller which varies the speed of the engine to supply more or less low heating value gas to compensate for variations in the heating value of the mixed gas.

Figure 2:
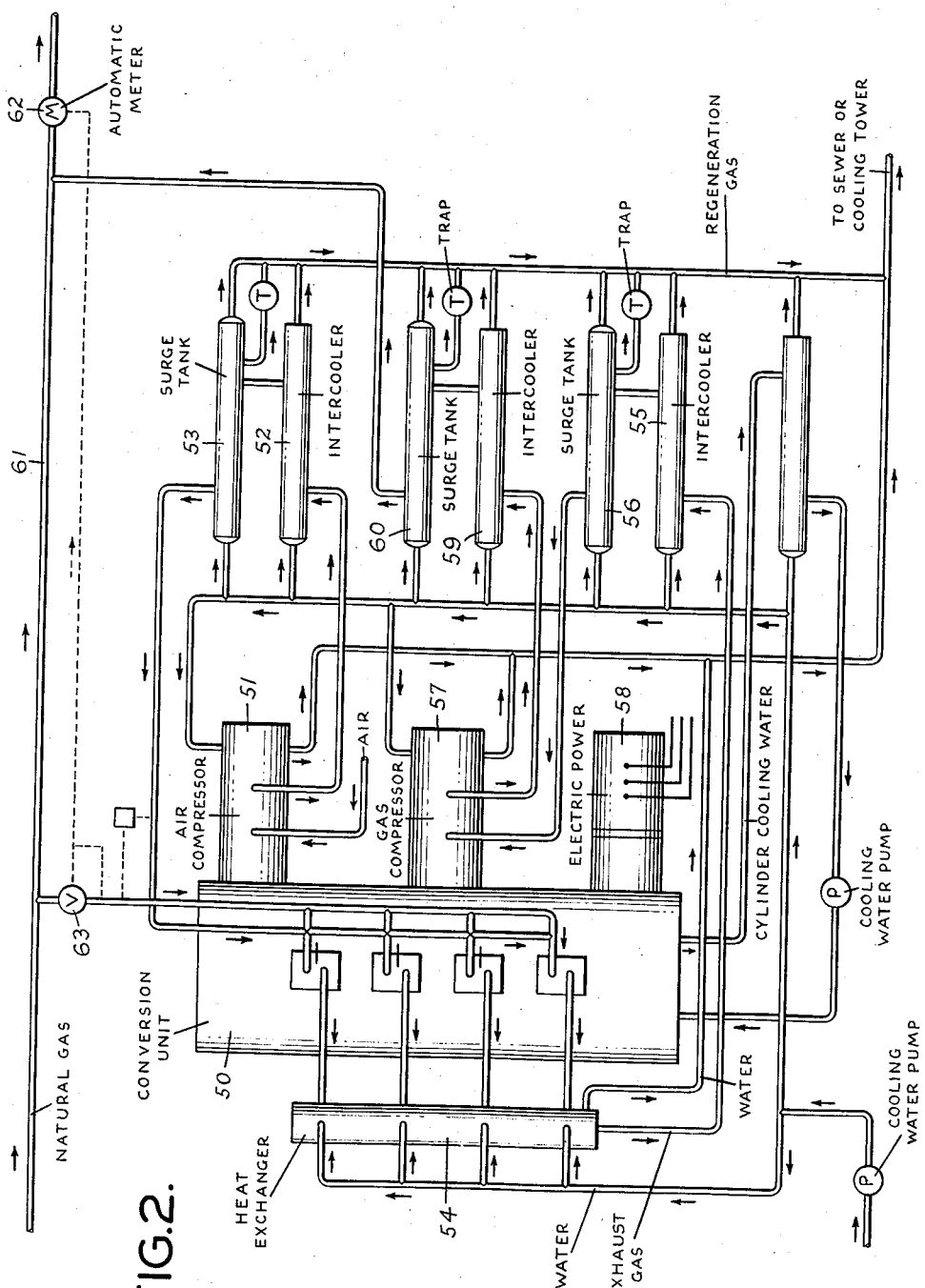

For a better understanding of the present invention, reference may be had to the accompanying drawings in which:

Fig. 1 is a schematic flow sheet of a typical system embodying and for practicing the present invention; and Fig. 2 is a schematic flow sheet of a modified system for practicing the invention.

The invention will be described with respect to several illustrative examples of methods and systems that may be used in gas distributing and transporting systems and for standby gas supply sources for local or industrial use. The system disclosed in Fig. 1 is suitable for regulating and controlling the B. t. u. value of natural gas in a supply and distribution line or system represented by the pipe line 10. In this system, the basic piece of equipment is a compound intermal combustion engine 11 of the four-cycle (Otto) type, although it may equally well be a two-cycle engine, a compression ignition engine, a free piston engine, a gas turbine or the like. The engine illustrated has eight water-cooled cylinders 12, 13, 14, 15, 16, 17, 18 and 19. In this engine, the cylinders 14 to 19, inclusive, are used for the production of the low heating value gas to be used as a diluent for the high heating value natural gas. The cylinders 12 and 13 are used as a control mechanism for regulating the quantity of low heating value gas to be generated, as will be explained hereinafter. If desired, the engine unit 11 may be made up of two engines, namely, a six-cylinder engine having the cylinders 14 to 19, and a two-cylinder engine having the cylinders 12 and 13, either coupled through the same crankshaft or by means of a coupling between the crankshafts of the two engines.

A series of compressors 20, 21, 22 and 23 are driven by the engine 11. The compressor 20 is used to supply air under high pressure to the engine cylinders 14 to 19 for incompletely burning natural gas which is taken off of the supply line through the conduit 24 and supplied to the cylinders 14 to 19. The compressor takes in air through its intake port 25 and discharges the air through the intercooler 26 and the drier 27 and to the cylinders 14 to 19 by means of the conduit 28. The compressor 20 is driven by the engine 11 to supply air at a pressure between about 25 lbs. and 100 lbs. per square inch gauge, depending upon requirements, and in a ratio to the fuel between about 4:1 and 7:1 and, preferably, between about 4.5:1 to 5.5:1. Inasmuch as the normal air to gas ratio for complete combustion is approximately 10:1, the air supplied to the cylinders 14 to 19 is insufficient to completely burn the natural gas in the cylinders to carbon dioxide and water. Accordingly, the exhaust gas discharged from the cylinders to the heat exchanger or cooler 30, does not contain oxygen and has a low heating value. If the natural gas has a heating value of approximately 1050 B. t. u. per cubic foot, the gas issuing from the exhausts of the engine will have a heating value between about 100 and 110 B. t. u. per cubic foot. The gas issuing from the heat exchanger 30 flows through the conduit 31 to an interstage cooler 32 and a surge drum of conventional type 33 and to the intake 34 of a first stage compressor 21. As shown in Fig. 1, the low heating value gas is passed through three stages of compression in the compressors 21, 22 and 23, being cooled and dried in the intercoolers and surge drums interposed between them. The highly compressed low heating value gas leaving the surge drum 35 may then be passed through the driers 36 and 37 which may contain a suitable desiccant, such as activated alumina or the like, and then is delivered to the pipe line 10 through suitable mixing orifices for intimate mixture with the high heating value natural gas therein. It will be understood that the desiccant in the driers 36 and 37 can be regenerated at intervals by heating it to drive off moisture. The desiccant in either drier 36 or 37 can be heated by passing a portion of the hot exhaust gas through the drier before it passes through the intercooler 32.

By suitably proportioning the volume of low heating value gas to the volume of the high heating value natural gas, a heating gas of a predetermined value can be obtained. Means is provided in the present system for maintaining the desired heating value in the resulting gas. Thus, the pipe line 10 is provided with an automatic meter 40 which is connected by means of suitable electric connections (not shown) with a control valve 41 for regulating the admission of natural gas to the cylinders 12 and 13 of the control unit. The gas is burned in the cylinders 12 and 13 in the presence of a normal amount of air, that is, at 10:1 ratio, and the exhaust gases are discharged to atmosphere. Inasmuch as the cylinders 12 and 13 are connected with the section of the engine having the cylinders 14 to 19, it is possible to vary the speed of the entire engine unit 11 by varying the amount of fuel supplied to the cylinders 12 and 13. To that end, the meter 40 opens the valve 41 further when a greater amount of low heating value gas is required and reduces the opening of the valve 41 when a lesser amount of low heating value gas is required.

The entire system may be water cooled and, as shown in Fig. 1, water may be supplied by means of pumps 42 and 43 at a cooling water plant to the cylinders 12 to 19 of the engine, the heat exchanger 30 and the various compressors and interstage coolers 32. Condensate in the intercoolers and surge drums is discharged with the water to sewage or a cooling tower.

A typical example of the operation of the system is as follows. Assuming that the heating value of natural gas is 1050 B. t. u. per cubic foot, it is controlled at 970 B. t. u. per cubic foot in the pipe line 10 with the apparatus shown in Fig. 1 in the following manner. Based upon 100 million standard cubic feet per day of natural gas of 1050 B. t. u. content per cubic foot and 800 lbs. per square inch gas line pressure, 1.51 million standard cubic feet per day of the natural gas is diverted to the engine unit 11. All eight cylinders of the engine are the same size, namely, a 22 inch stroke and a 15½ inch bore. The engine is operated at a compression ratio of 3:1 and at a speed of up to 375 revolutions per minute. The unit including the cylinders 14 to 19 is fired with approximately 1.45 million cubic feet of natural gas per day and with 5 volumes of air per volume of natural gas. The air is supercharged to 25 lbs. per square inch gauge pressure by the compressor 20 and enters the cylinders 14 to 19 at approximately this pressure. The exhaust or low heating value gas discharged from the cylinders measures 9 million standard cubic feet per day, after removal of moisture, and has a heating value of 103 B. t. u. per cubic foot. When the exhaust gas is mixed with the remainder of the 100 million standard cubic feet per day of natural gas, a mixed gas having a heating value of about 970 B. t. u. per cubic foot is produced. With the automatic meter 40 set for a desired value of 970 B. t. u. per cubic foot, an increase in the B. t. u. value above the 970 B. t. u. will cause the valve 41 to open, thereby supplying more fuel to cylinders 12 and 13 and increasing the speed of the engine unit 11. If the value of the mixed gas falls below 970 B. t. u. per cubic foot, the meter will detect it and will partially close the valve 41, thereby slowing down the engine 11 and decreasing the volume of exhaust gas.

With an engine of the size and operating characteristics indicated, the cylinders 14 to 19 generate 2,355 H. P. The power required to operate the compressor 20 to supercharge the air is 525 H. P. The power required to compress the low heating value gas in the compressors 21, 22 and 23 is 2070 H. P., thereby indicating a total power requirement of 2,595 H. P. The deficiency of power between that generated by the engine having the cylinders 14 to 19 and that required for compressing the air and the low heating value gas, i. e. 240 H. P., is easily supplied by the control section of the engine having the cylinders 12 and 13. These cylinders are fired with approximately .06 million standard cubic feet of gas per day and with an air to gas ratio of approximately 10:1.

The above-described system makes for efficient utilization of power. Thus, while substantial power is required for operating the compressor 20 to supply supercharged air to the cylinders 14 to 19, a desirable indirect gain accrues from the use of high supercharging pressures. By using a supercharging pressure of 25 lbs. per square inch as compared with 5 lbs. per square inch for conventional engines, the quantity of low heating gas produced per cylinder is more than doubled and the power generated per cylinder is raised to nearly equal the power generated by the same size cylinder of a conventional engine supplied with air adequate for complete combustion of the fuel. Moreover, the exhaust gas discharged from the cylinders 14 to 19 has a pressure of about 30 lbs. per square inch so that the exhaust gas is already partially compressed when it is introduced into the compressor 21. In this way, the net power requirements for operating the compressors 21 to 23 is reduced approximately 725 H. P., the amount of power that would otherwise be required to compress the exhaust gases from atmospheric pressure to 30 lbs. per square inch. It should be noted that unless a high supercharging pressure is used, a high exhaust pressure cannot be developed without seriously affecting the volumetric efficiency of the engine.

The use of high supercharging pressure increases the capacity of an engine of given physical size to produce both gas and power. For example, the capacity of an engine of the type described above when operated at 25 lbs. per square inch air pressure is approximately 9 million standard cubic feet per day of exhaust gas, whereas its capacity would be only about one-half of that if the supercharging pressure were limited to 5 lbs. per square inch. The advantage of the high exhaust pressure has been indicated above.

The use of the extra control cylinders 12 and 13, or an engine having cylinders 12 and 13, provides a very satisfactory control for the system with a minimum of use of fuel gas. It consumes only about 2 to 8% of the total natural gas supplied to the engine 11, so that it is not wasteful, and, in fact, it supplies the necessary power required for operating the compressors which is not supplied by the remainder of the engine 11.

While the system described above and the method of operation described, are preferred because of the interrelation of the parts as regards gas and power production, it will be appreciated that the system can be modified substantially depending upon requirements. For example, as shown in Fig. 2, a simple four-cylinder, four-cycle engine 50 may be utilized to supply low heating value gas to drive the compressors necessary for the operation of the system and, in addition, to generate electric power. In a typical operation, a fuel gas of 550 B. t. u. heating value can be produced from natural gas of 1050 B. t. u. heating value by means of the system shown in Fig. 2. Based upon a production of 3 million standard cubic feet per day of fuel gas of 550 B. t. u. value compressed to 50 lbs. per square inch gauge pressure, 255,000 standard cubic feet of natural gas and 1,530,000 standard cubic feet per day of air are charged to the engine 50. Each cylinder of the engine has a 10 inch bore, a 14 inch stroke and is operated at a compression ratio of 3:1. The engine operates at a speed of approximately 350 revolutions per minute. Air is supercharged to a pressure of 25 lbs. per square inch in the compressor 51 which is driven by the engine and enters the cylinder at about that pressure, after passing through a cooler 52 and the surge drum 53. Exhaust gas resulting from operation of the engine has a heating value of 103 B. t. u. per cubic foot and measures 1,580,000 standard cubic feet per day, after cooling in the heat exchanger 54 and removal of the moisture therefrom in the intercooler and water separator 55, 56.

The power generated by the engine 50 is 416 H. P. 18.5 horsepower are required to supercharge the air in the supercharger and 65.5 H. P. are required to compress the low heating value gas in the gas compressor 57. Accordingly, the engine generates an excess or surplus of 332 H. P. which can be utilized for driving an electric generator 58 or for any other useful purpose. Compressed gas from the compressor 57 which is discharged through the intercooler 59 and surge drum 60 is mixed with the natural gas in the pipe line 61 and the mixed or blended gases then flow by the automatic meter 62 which is connected with a control valve 63 through which the gas is admitted from the pipe line 61 to the cylinders of the engine 50, thereby controlling its speed. The gas discharged from the cylinders of the engine has a pressure of 30 lbs. per square inch which materially aids in compressing the gas to pipe-line pressure of 50 lbs. The use of a high pressure exhaust system made possible by supercharging the air reduces the power requirements approximately 130 H. P. and has the other advantages pointed out above.

The above examples apply to the supply of gas to pipe line systems but the same principles may also be utilized in providing a standby source of heating gas for use in times of emergency or when the demands exceed the capacity of a manufactured gas plant. By way of example, a fuel of 550 B. t. u. heating value can be produced from propane of 2503 B. t. u. heating value with a system of the type shown in Fig. 2. Based on the production of 8 million standard cubic feet per day of 550 B. t. u. gas compressed to 100 lbs. per square inch gauge pressure, 12,300 gallons of propane and 4,490,000 standard cubic feet of air per day are charged to an engine similar to the engine 50. This engine has four cylinders, each having a 15½ inch bore, a 22 inch stroke and a compression ratio of 3:1. The engine operates at a speed of about 320 revolutions per minute.

Air is compressed and propane is pumped at 25 lbs. per square inch gauge pressure and the air and propane enter the engine cylinders at essentially this pressure. Exhaust gas having a heating value of 122 B. t. u. per cubic foot, after removal of moisture, is produced at the rate of 6,560,000 standard cubic feet per day. The exhaust gas is mixed with 39,800 gallons of propane vaporized to produce a total yield of 8 million standard cubic feet of a mixed gas of 550 B. t. u. heating value. The excess power developed in this operation can be used for driving an electric generator, as described above, or the amount of power can be reduced by conducting the combustion in a less efficient manner or by reducing the size of the engine. One way of reducing generation of power is to use a less efficient type of engine, for example, a two-cycle Lenoir type of engine. Such two-cycle engines are less efficient than four-cycle engines so that the horsepower generated per unit of fuel is less. However, it is possible to compress more propane and air into a cylinder of a given size by raising the supercharging pressure to about 85 lbs. per square inch. The two-cycle engine operates at about the same speed as the engine described above but at a higher compression ratio, naamely, a compression ratio of about 4:1. When producing a fuel gas of 550 B. t. u. per cubic foot from propane, the size of the cylinders of the two-cylinder engine may be a 15½ inch bore and a 22 inch stroke. This plant will again produce 8 million standard cubic feet per day of 550 B. t. u. fuel gas compressed to 100 lbs. per square inch gauge pressure. To attain this production, 11,300 gallons of propane and 5,330,000 standard cubic feet of air are charged to the engine under a pressure of about 85 lbs. per square inch. The exhaust gas is discharged from the engine at 125 lbs. per square inch gauge pressure which is ample to push it directly into the fuel gas distribution system without further compression. The engine described generates 800 H. P., which is exactly the power required to supercharge the air. In this case, the engine conditions have been selected to attain the balance indicated.

In some situations, it may be difficult to maintain proper operation of the engines because combustion is rendered less efficient by the deficiency of air. It is recognized that spark ignition of rich fuel air mixtures is more difficult than the ignition of mixtures having normal air content. The difficulties inherent in the use of rich fuel mixtures can, however, be overcome by regulating the ratio of fuel and air near the end of the intake stroke of the engine so that the mixture in the vicinity of the spark plug will be more nearly a normal fuel-air mixture. This can be accomplished in any of a number of different ways and most easily by providing a crankshaft driven valve for admitting the fuel into the system which admits the major portion of the fuel during the beginning of the intake stroke and gradually reduces the rate of inflow of the fuel into the cylinder. For example, a rotary fuel inlet valve driven by the crankshaft of the engine and opened and closed in timed relation to the conventional poppet intake valves of the engine will alter the rate of flow of gas and provide the desired fuel-air ratio to promote combustion.

From the preceding description of typical methods and systems embodying the present invention, it will be apparent that the present systems take advantage of the characteristics of fuel gases to generate power and produce substantially automatically a diluting gas in sufficient quantity to regulate the B. t. u. or heating value of the fuel gas so that it can be handled efficiently and supplied for household and commercial purposes without further treatment or without modification of existing equipment for utilizing it. Moreover, the method and the system can be practiced and developed utilizing readily available equipment, much of which, such as the engines and compressors, may already be available at the location where the system is most required. Moreover, simple and efficient systems that can quickly be set into operation embodying the present invention can be used as standby gas supply sources for generation of heating gases from propane and the like, in the gas generating plants of municipalities and the like.

It will be understood from the preceding examples, that the systems and methods disclosed herein are susceptible to considerable variation in size and arrangement, depending upon the commercial and industrial applications or requirements for which they are provided. Accordingly, the examples given herein should be considered as illustrative and not as limiting the scope of the following claims.

I claim:

1. A method of regulating the heating value of a fuel gas of high heating value which comprises burning a portion of a fuel gas in an internal combustion engine in the presence of insufficient oxygen to fully burn the fuel gas to generate power and produce an exhaust gas of low heating value, mixing the exhaust gas with said fuel gas to produce a mixed gas having a heating value intermediate the heating values of said fuel gas and said exahust gas, continuously determining the heating value of the mixed gas and regulating the speed of said engine to produce exhaust gas at an increased rate when the heating value of the mixed gas exceeds a predetermined value and at a decreased rate when the heating value of the gas is less than said predetermined value.

2. A method of regulating the heating value of a fuel gas of high heating value which comprises diverting fuel gas from a flowing stream of the fuel gas under pressure and burning the diverted gas in an internal combustion engine in the presence of compressed oxygen-containing gas in an amount insufficient to burn the fuel gas completely, thereby generating power and producing an exhaust gas of low heating value, mixing the exhaust gas with the flowing stream of gas to produce a mixed gas of lower heating value than said fuel gas, and regulating the speed of said engine to produce exhaust gas at an increased rate when the heating value of the mixed gas exceeds a predetermined value and at a decreased rate when the heating value of the gas is less than said predetermined value.

3. The method set forth in claim 2 in which at least part of the power generated by said engine is used to compress the oxygen-containing gas.

4. The method set forth in claim 2 in which at least a part of the power generated by said engine is used to compress the exhaust gas and introduce it into said flowing stream.

5. The method set forth in claim 2 in which the exhaust gas is discharged from the engine in a compressed state to aid in mixing it with the flowing stream of fuel gas.

6. The method set forth in claim 2 in which the fuel gas is natural gas.

7. The method set forth in claim 2 in which the oxygen-containing gas is compressed to a pressure between about 25 and 100 pounds per square inch gauge.

8. A system for regulating the heating value of a fuel gas to maintain its heating value substantially constant, comprising conduit means for a flowing stream of fuel gas under pressure, an engine operable on said fuel gas, means for supplying fuel gas from said conduit to said engine, means for supplying an oxygen-containing gas under pressure to said engine at a rate sufficient to support combustion of the fuel gas in the engine but insufficient to burn the fuel gas completely, whereby said engine produces power and exhaust gas of low heating value, means for conducting said exhaust gas from said engine to the conduit means to mix with the fuel gas therein, means communicating with said conduit downstream of said engine for determining the heating value of the mixed gas in said conduit means, and means responsive to the means for determining the heating value of the gas and to variation of the heating value of the mixed gases from a predetermined value for increasing the speed of the engine to increase the rate of production of the exhaust gas when the heating value of the mixed gases exceeds said prodetermined value and decreasing the speed of said engine to decrease the rate of production of the exhaust gas when the heating value of the gas is less than said predetermined value.

9. A system for regulating the heating value of a fuel gas to provide a substantially uniform heating value, comprising conduit means supplied with a fuel gas under pressure, an engine operable on said fuel gas, means for supplying said fuel gas from said conduit means and oxygen-containing gas at superatmospheric pressure and in a ratio such that the fuel gas is incompletely burned in said engine to produce an exhaust gas of lower heating value than said fuel gas, a connection between said engine and said conduit for introducing said exhaust gas into said conduit means for mixing with the fuel gas therein to provide a mixed gas of lower heating value than said fuel gas, means communicating with said conduit means downstream of said connection for determining the heating value of the mixed gas in said conduit means, means for regulating the speed of said engine to control the amount of exhaust gas produced by the engine, and an operative connection between said determining means and the regulating means to increase the speed of said engine when the heating value of said mixed gases exceeds a predetermined value and decreasing the speed of said engine when the heating value of the mixed gases is less than said predetermined value.

10. The system set forth in claim 9 comprising compressing means driven by said engine for compressing the exhaust gas to the pressure of the fuel gas in the conduit means.

11. The system set forth in claim 9 in which the means for regulating the engine comprises another engine burning said fuel gas as a fuel and connected to and supplying power to the first-mentioned engine to aid in controlling the speed of the latter.

12. The system set forth in claim 9 in which the means for supplying fuel gas and an oxygen-containing gas to said engine comprises a supercharger driven by said engine for compressing said oxygen-containing gas.

References Cited in the file of this patent

UNITED STATES PATENTS

| | | |
|---|---|---|
| 1,899,869 | Heusser | Feb. 28, 1933 |
| 1,954,991 | Garner et al. | Apr. 17, 1934 |
| 2,258,486 | Firth et al. | Oct. 7, 1941 |
| 2,591,687 | Eastman et al. | Apr. 8, 1952 |
| 2,738,262 | Benz et al. | Mar. 13, 1956 |

OTHER REFERENCES

Deanesly et al.: "Gas Age," August 31, 1950, pages 30–33, 53, 54.